United States Patent [19]

Saito

[11] 4,451,835

[45] May 29, 1984

[54] THERMAL RECORDING DEVICE

[75] Inventor: Tamio Saito, Tokyo, Japan

[73] Assignee: Tokyo Shibaura Denki Kabushiki Kaisha, Kawasaki, Japan

[21] Appl. No.: 434,390

[22] Filed: Oct. 14, 1982

[30] Foreign Application Priority Data

Oct. 19, 1981 [JP] Japan ................................ 56-166742

[51] Int. Cl.$^3$ ........................ G01D 15/10; H05B 1/00

[52] U.S. Cl. ................................ 346/76 PH; 219/216

[58] Field of Search .................. 346/76 PH; 219/216; 400/120

[56] References Cited

U.S. PATENT DOCUMENTS 3,833,789 9/1974 Taniguchi ........................... 219/216
3,982,093 9/1976 Henrion ............................ 219/216
4,099,046 7/1978 Boynton ............................ 219/216
4,250,375 2/1981 Tsutumi ............................ 219/216

FOREIGN PATENT DOCUMENTS 50-333418 10/1975 Japan .
55-140577 11/1980 Japan .

*Primary Examiner*—Joseph W. Hartary
*Attorney, Agent, or Firm*—Oblon, Fisher, Spivak, McClelland & Maier

[57] ABSTRACT

A thermal recording device has a thermal head section and a drive section. The thermal head section is comprised of a common electrode provided on an insulation member, an insulation layer with an opening provided on the common electrode, a plurality of recording resistive elements formed on a part of the insulation layer and the insulation member, and a connection conductor layer provided on the common electrode, which is connected to the common electrode through the opening, and to one end of each of the resistive elements. The drive section selectively feeds current to the resistive elements selected according to the data to be recorded.

2 Claims, 5 Drawing Figures

THERMAL RECORDING DEVICE

BACKGROUND OF THE INVENTION

The present invention relates to a thermal recording device for recording data on a thermal sensitive medium.

In this type of thermal recording device, a plurality of resistive elements are arranged on a heat-resisting substrate. The resistive elements are selectively and electrically energized according to the data to be recorded on a thermal recording paper, for example, to thereby record the corresponding data on the thermal recording paper due to the heat energy evolved from the energized resistive elements.

The principle of the prior thermal recording device will be described referring to FIG. 1. A plurality of resistive elements R1 are serially connected to corresponding transistors TR1 between the terminals of a DC power source 1. The gates of the transistors TR1 are turned on and off by the output signals from the corresponding stages of a shift register 2 which receives, at its inputs, the data to be recorded. The data corresponding to the data applied to the shift register are recorded on a thermal sensitive paper moving relative to the resistive element array.

The thermal recording device of this type is used for a facsimile or information retrieval equipment for recording figures, characters and the like.

For ease of explanation, a section having resistive elements R1, a common electrode 3, and the like will be referred to as a thermal head section, and a circuit section for selectively driving the resistive elements will be referred to as a drive section. In constructing the thermal head section, the common electrode film 3 is first formed on a heat resisting and insulation substrate. Then, a resistive layer is formed on the substrate, partially contacting with the common electrode film 3 by a sputtering process. Then, the resistive layer is patterned to form the resistive elements R1. However, it has been experimentally determined that the resistance of the resistive layer thus formed is not uniform over the entire resistive layer. The nonuniform resistance may be caused by a variation in the plasma density, i.e. an intensity of the electrical field, between the location of the sputter material and the location of the resistive layer. The variation of the resistance of the resistive layer provides resistive differences among the resistive elements R1 which are formed by patterning the resistive layer. The nonuniform resistance is undesirable. It is necessary to measure the resistivity of the resistive layer after the layer is formed by the 4-terminal measuring method. Nevertheless, since the resistive layer directly contacts with a conductive layer constituting the common electrode film 3, it is impossible to measure the resistivity.

SUMMARY OF THE INVENTION

Accordingly, an object of the present invention is to provide a thermal recording device including a thermal head section having a plurality of resistive elements, each element having one end connected to a common electrode by way of a conductive layer formed on an insulation layer.

In order to accomplish the aforesaid object, there is provided a thermal recording device comprising a thermal head section which includes at least one recording unit for recording data on a thermal sensitive medium, the recording unit including a plurality of resistive elements formed on a surface of an insulation member, and a common electrode formed on the surface for connecting one end of each of the resistive elements corresponding to the recording unit; and a drive section connected between the common electrode and the other end of each of the resistive elements for selectively feeding current into the resistive elements according to data to be recorded. The thermal head section comprises an insulation layer provided on the common electrode and having an opening provided at a position on the common electrode, and a conductive layer provided on the insulation layer for coupling the common electrode with one end of each of the resistive elements, through the opening.

With such a structure, a resistive layer can be formed on the insulation layer provided on the common electrode by electrically separating the resistive layer from the common electrode. The sputtering process for forming the resistive layer is not influenced by a nonuniform electric field. Accordingly, the resistive layer formed is uniform in the distribution of its resistance. Further, the resistive layer allows its resistivity to accurately be measured. As a result, the resistance values of the resistive elements formed by patterning the resistive layer can be set to a given fixed value. Thus, the production yield of the thermal recording device can be improved.

DETAILED DESCRIPTION OF THE PREFERRED EMBODIMENTS

Figure 1:
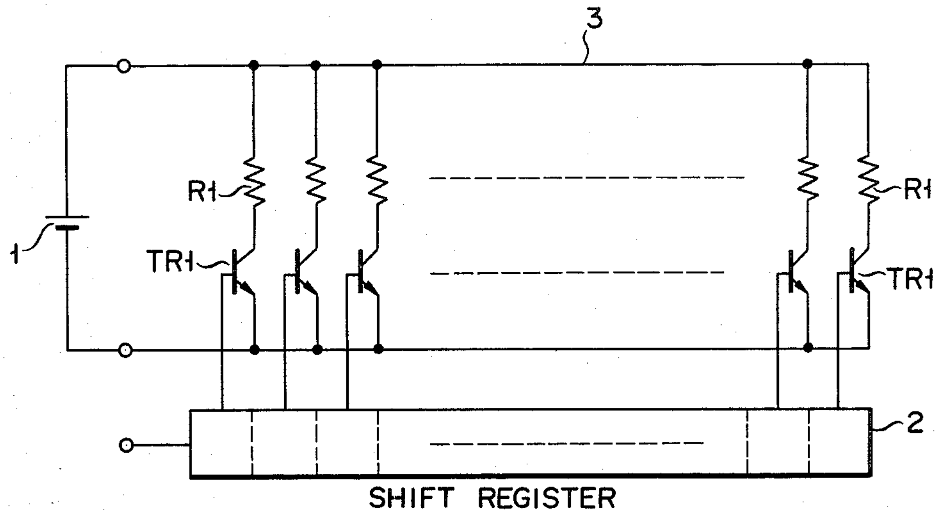
FIG. 1 PRIOR ART
FIG. 1 is a circuit diagram of a prior thermal recording device.

An embodiment of a thermal recording device according to the present invention will be described referring to FIGS. 2 to 4. A common electrode 7 is provided on an insulation substrate such as a ceramic substrate 6. A glass layer 8 is further provided on the substrate in parallel with the common electrode 7. An insulation layer 9 is additionally provided on the common electrode 7, of which the right end extends in contact with the left end of the glass layer 8, as shown in FIG. 4. A plurality of resistive elements R1 provided on the glass layer 8 each extends at one end on the insulation layer 9 and at the other end on the substrate 6. The insulation layer 9 has a slit like opening 10 extending in parallel with the common electrode 7 at a proper position on the electrode 7. A connecting conductive layer 11 for connecting the resistive elements R1 with the common electrode 7 is provided on the insulation layer 9 with the right end contacted with the left ends of the resistive elements R1. Connection conductors 12 corresponding to the resistive elements R1 are provided on the right ends of the resistive elements R1, respectively (FIG. 4). The extended portions of the connection conductors 12 are connected to the collectors of the transistors TR1 shown in FIG. 2, respectively. The portion of each of the resistive elements R1 not contacting with the connection conductors 11 and 12 serves as a heating portion for the data recording. The connection conductor layer 11 and the common electrode 7 are electrically connected through the slit like opening 10, as a matter of course. Reference numeral 14 designates a protective insulation layer and reference numeral 15 is a drive section to be described later.

Figure 2:
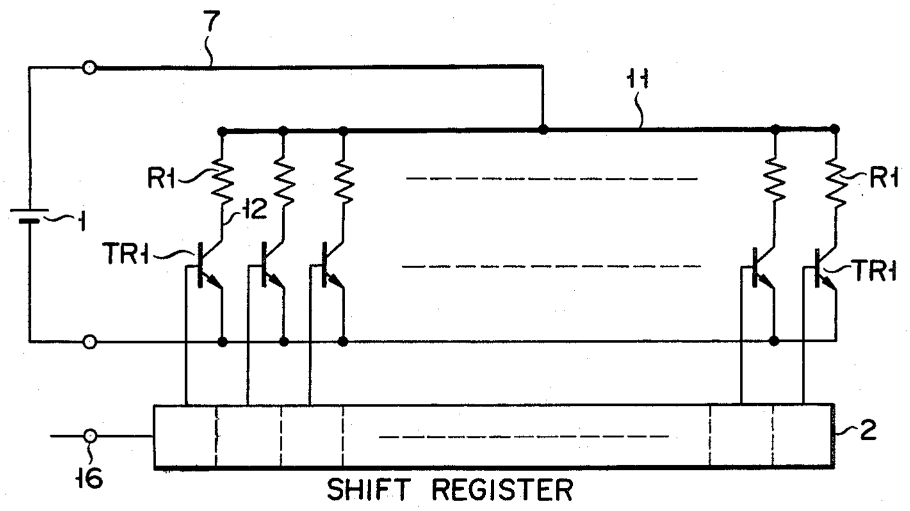
FIG. 2 is a circuit diagram of an embodiment of a thermal recording device according to the present invention.

As shown in FIG. 2, n resistive elements R1 are arranged in parallel to form a single recording unit. One end of each resistive element is connected to the connecting conductor 11 which is further connected through the slit like opening 10 to the common electrode 7. The common electrode 7 is connected to the positive terminal of a power source 1. The other end of each resistive element is connected, through respective connecting conductors 12 and the emitter-collector paths of the corresponding transistors TR1, to the negative terminal of the power source 1. Data (a combination of "1" and "0") corresponding to a picture signal, for example, is fed to the input terminal of the shift register 2. Then, the data is stored in the respective stages of the shift registers 2. In turn, the outputs of the shift register are applied to the gates of the transistors TR1 corresponding to the stages of the shift register. At this time, only the transistors corresponding to the data "1" are conductive and heating currents are fed to the corresponding resistive elements. In this way, the picture corresponding to the picture signal supplied to the input terminal 16 is recorded on the thermal sensitive paper moving on the thermal head section.

An example of a method of manufacturing a thermal head section will be described referring to FIGS. 3 and 4. A band like glass layer 8 is formed on a rectangular ceramic substrate 6 and a common electrode 7 is formed in parallel with the glass layer 8. For forming the common electrode 7, a thick film paste such as gold paste is printed on a substrate 6 and then is sintered. An insulation layer 9 is formed on the common substrate 7, and on a part of the substrate 6, contacting with the left end of the glass layer 8 (FIG. 4). For forming the insulation layer 9, insulation paste for thick film containing boronsilicate glass, for example, is printed on a given location, dried and sintered. Then, a slit like opening 10 is formed at a proper location of the insulation layer 9 on the common electrode 7. A resistive layer is formed on the glass layer, of which one end extends on the insulation layer 9, while the other end extends to the substrate 6. The resistive layer may be formed by sputtering a resistive material such as tantal-silicate (Ta-$SiO_2$). A plurality of the resistive elements R1 are formed by patterning the resistive layer. Before the patterning of the resistive layer, the resistance of the resistive layer is measured to check that the resistive layer exhibits a given resistance value and that a variation of resistances at the individual locations falls within a given tolerance. A connecting conductive layer 11 is sputtered on the insulation layer 9 and one end of each of the resistive elements R1.

In the next step, connecting conductors 12 are formed for connecting the other end of each of the resistive elements R1 to a corresponding transistor TR1. Following this, a protective film 14 is formed. All of the parts for forming the drive section shown in FIG. 2, such as the transistors TR1, the shift register 2, and the power source 1, are not necessarily formed within the drive section 15. A proper number of the parts for the drive section may be contained in the drive section 15 shown in FIG. 4. It is preferable, however, that the transistors TR1 and the shift register 2 except the DC source 1 are formed on an IC chip, the IC chip is metal-capped and then is arranged on the substrate 6. FIG. 3 shows a plan view when the protective insulation film 14 is removed in FIG. 4.

Figure 3:
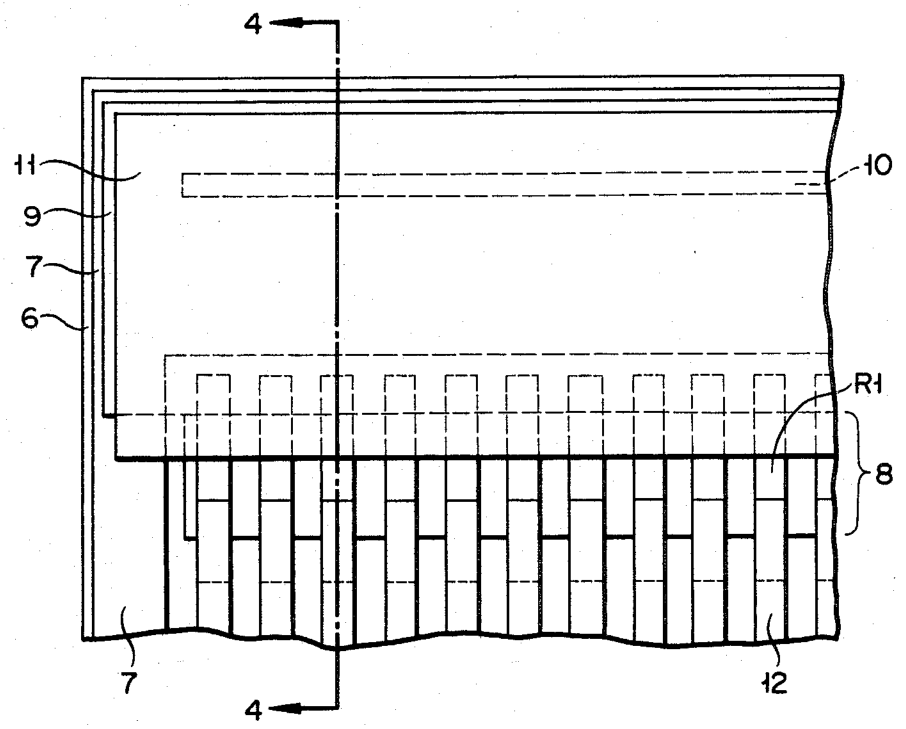
FIG. 3 shows a plan view of a part of a thermal head section of a thermal recording device shown in FIG. 2.
Figure 4:
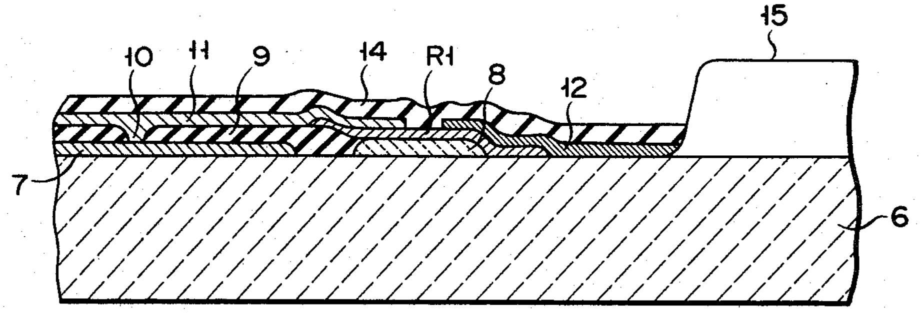
FIG. 4 shows a cross sectional view taken on line 4—4 shown in FIG. 3.

As shown in FIGS. 3 and 4, the resistive layer for forming the resistive elements R1 is formed by the sputtering process, while not electrically connected to the common electrode 7. Therefore, the resistive layer with resistance uniformly distributed over its entire area can be formed. The resistance value of the resistive layer can be measured by the four terminal measuring method, for example, without being influenced by the presence of the common electrode 7. Thus, in the thermal recording device according to the present invention, the resistive elements have uniform and desired values.

Figure 5:
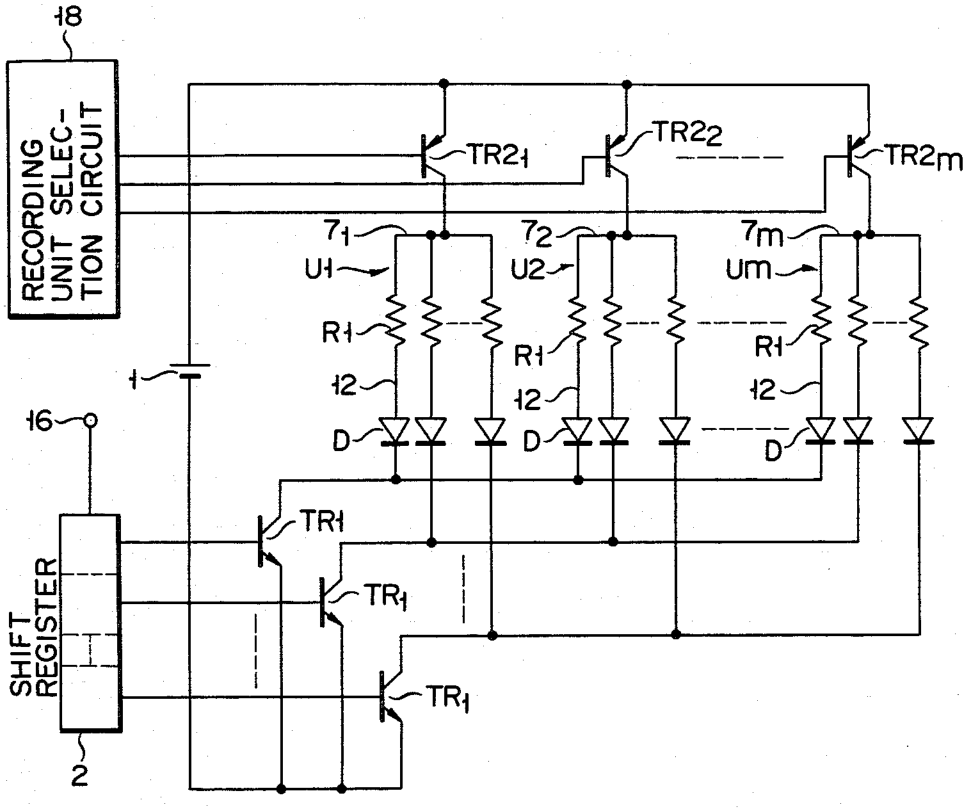
FIG. 5 is a circuit diagram of another embodiment of a thermal recording device according to the present invention.

Another embodiment of a thermal recording device according to the present invention will be described referring to FIG. 5. In FIG. 2, a single recording unit is used. The output signals from the respective stages of the shift register 2 are simultaneously applied to the gates of the corresponding transistors TR1, thereby to selectively energized the resistive elements R1. In the embodiment shown in FIG. 5, m recording units U1, U2, . . . Um are used which are sequentially selected by a recording unit selection circuit 18. The selected units are sequentially recorded in the selected order. The recording system of this type is known as a recording system for a matrix drive system. The constructions of these recording units are identical to one another. Accordingly, the recording unit U1 will be described as a typical example. The recording unit U1 has n resistive elements R1 connected together to the common electrode $7_1$. The method to form the resistive elements R1 and the method to electrically connect one end of each of the resistive elements to the common electrode $7_1$ are exactly the same as those described referring to FIG. 4. The common electrode $7_1$ is coupled to the positive terminal of the power source 1 through a transistor $TR2_1$ of which the gate is supplied with a selection signal from the recording unit selection circuit 18. The other end of each of the resistive elements R1 is connected to the negative terminal of the power source 1 through the connection conductor 12 (FIG. 4), the diode D and the transistor TR1. The output signals from the respective stages of the shift register 2 of which the input terminal 16 is supplied with a picture signal, are applied to the gates of the corresponding transistors TR1, respectively. A difference between the present embodiment and the embodiment of FIG. 2 resides in that the diodes D with the polarity as shown are inserted between the other end of each of the resistive elements and the corresponding transistors TR1. The diode serves for feeding current into only the selected resistive element or elements R1. According to this method, the recording units U1, U2, . . . , Um are sequentially selected and recorded, for example, from the unit U1 to Um. In the arrangement of the present embodiment, the recording units are formed with m common electrodes and $m \times n$ resistive elements on the same substrate. The shift register 21 is used commonly for all the recording units.

What is claimed is:

1. A thermal recording device comprising:

a thermal head section which includes at least one recording unit for recording data on a thermal sensitive medium, said recording unit including a plurality of resistive elements formed on a surface of an insulation member, and a common electrode formed on said surface for connecting one end of each of said resistive elements corresponding to said recording unit; and a drive section connected between said common electrode and the other end of each of said resistive elements for selectively feeding current into said resistive elements according to data to be recorded; wherein said thermal head section comprises an insulation layer provided on said common electrode and having an opening which is provided at a position on said common electrode, and a conductive layer provided on said insulation layer for coupling said common electrode with said one end of each of said resistive elements, through said opening.

2. A thermal recording device according to claim 1, wherein said resistive elements are formed by patterning a resistive layer which is formed by a sputtering method, in a state that said resistive layer is electrically isolated from said common electrode.

* * * * *